Patented Apr. 22, 1941

UNITED STATES PATENT OFFICE 2,239,018

WELDING METHOD AND FLUX FOR THE SAME

William Middleton Rogerson, New Kensington, Pa., assignor to Aluminum Company of America, Pittsburgh, Pa., a corporation of Pennsylvania No Drawing. Application May 14, 1937, Serial No. 142,620

9 Claims. (Cl. 113—112)

This invention relates to the fusion welding of dissimilar metals, and particularly to the welding of copper to aluminum, by which it is meant to include alloys of these metals.

It has been the prior practice to effect joints between copper and aluminum either mechanically or by soldering, and both of these methods have proven unsatisfactory for some purposes. The disadvantages of mechanical joints, especially in electrical equipment and circuits, are well known. The soldering method produces a joint of low mechanical strength, and further, the interposition of the known soldering compositions between the dissimilar metals produces a structure having high susceptibility to galvanic corrosion in the presence of moisture. The necessity for joining these two metals occurs most frequently in structures where both are used as electrical conductors, and in this application soldered joints have the further disadvantage of offering substantially more resistance to the passage of electric currents than either of the metals soldered.

Prior to my invention, it had been impossible to effect a satisfactory fusion weld between copper and aluminum when utilizing either of them as the joining medium, by means of the gas flame, metallic arc, or carbon arc welding processes. I have found, however, that by adding cadmium, either in the metallic form or in the form of a salt of cadmium which is decomposable at welding temperatures, to the fusion zone in the presence of a welding flux composition suitable for welding aluminum, a good welded joint can be effected between parts of aluminum and copper.

In practice, it is usually most convenient to provide the cadmium by adding it to a welding flux composition in the form of a halide of cadmium such as cadmium chloride. The halogen salt is readily decomposable at welding temperatures, and appears to facilitate the fluxing action of the flux composition. Suitable flux compositions for welding aluminum, generally consisting of mixtures of alkali metal halides, are well-known in the art. Typical examples of these fluxes are given below:

|  | I | II |
| --- | --- | --- |
|  | Percent by weight | Percent by weight |
| Lithium chloride (LiCl) | 13.5 | 10.0 |
| Sodium chloride (NaCl) | 37.5 | 35.0 |
| Potassium chloride (KCl) | 33.0 | 35.0 |
| Potassium fluoride (KF) | 9.0 | 5.0 |
| Sodium fluoride (NaF) | 7.0 | 10.0 |
| Cryolite ((NaF)$_3$AlF$_3$) |  | 5.0 |

When adding cadmium chloride to fluxes of substantially the above composition, I prefer to add about 20 per cent by weight to the mixture, although there appears to be nothing critical about the amount of the addition. The minimum amount of cadmium or cadmium salt required to produce a weld depends largely upon the source of heat and the method of manipulating the welding torch or arc. The maximum permissible cadmium addition to any welding flux is reached only when it is sufficient to impair the fluxing action of the alkali halide constituents of the flux on the aluminum. Obviously, some of the aluminum fluxes to which the cadmium may be added are more active in their fluxing action than others, and these may permit of higher cadmium or cadmium salt additions while still providing adequate fluxing action on the aluminum.

In effecting the weld, I prefer to use an aluminum welding rod having substantially the same characteristics as the aluminum part to be joined to the copper. While copper welding rod may be used, it is usually more difficult to manipulate to effect a satisfactory joint because of its higher melting point. When aluminum welding rod is used, a satisfactory joint may be readily effected by any one familiar with the fusion welding of aluminum.

The joints formed by the described process have extremely high tensile strength and excellent electrical conductivity. The corrosion resistance of the joint is much superior to a soldered joint, and is even more resistant to corrosion than a mechanical joint between the two materials. For this reason, it is ideally suited for joining electrical conductors formed of the two metals, because both the mechanical strength and the electrical conductivity of the joint can be maintained under adverse corrosive conditions.

As previously stated, the terms aluminum and copper are intended to include alloys of aluminum and alloys of copper, respectively. These terms are so used in the appended claims; and the term fusion weld is intended to include fusion welds made with a gas flame, carbon arc or metallic arc.

I claim:

1. A flux for the fusion welding of aluminum to copper, containing a mixture of alkali metal halides and cadmium.

2. A flux for the fusion welding of aluminum to copper, containing a mixture of alkali metal halides and cadmium chloride.

3. A flux for the fusion welding of aluminum to copper, consisting essentially of a mixture of alkali metal halides and cadmium chloride in an amount equal to about 20 per cent by weight of the total flux mixture.

4. A method of producing a welded joint between aluminum and copper, said weld being characterized by high tensile strength, high electrical conductivity and an improved resistance to corrosion as compared to a soldered joint between the same two metals, said method comprising effecting a fusion weld in the presence of an alkali metal halide flux and metallic cadmium.

5. A method of producing a welded joint between aluminum and copper, said weld being characterized by high tensile strength, high electrical conductivity and an improved resistance to corrosion as compared to a soldered joint between the same two metals, said method comprising effecting a fusion weld in the presence of an alkali metal halide flux containing a decomposable cadmium salt.

6. A method of producing a welded joint between aluminum and copper, said weld being characterized by high tensile strength, high electrical conductivity and an improved resistance to corrosion as compared to a soldered joint between the same two metals, said method comprising effecting a fusion weld in the presence of an alkali metal halide flux containing cadmium chloride.

7. A method of producing a welded joint between aluminum and copper, said weld being characterized by high tensile strength, high electrical conductivity and an improved resistance to corrosion as compared to a soldered joint between the same two metals, said method comprising fusing said metals and an aluminum welding rod at the interface between said aluminum and copper, said fusion being effected in the presence of an alkali metal halide flux and metallic cadmium.

8. A method of producing a welded joint between aluminum and copper, said weld being characterized by high tensile strength, high electrical conductivity and an improved resistance to corrosion as compared to a soldered joint between the same two metals, said method comprising fusing said metals and an aluminum welding rod at the interface between said aluminum and copper, said fusion being effected in the presence of an alkali metal halide flux and a decomposable cadmium salt.

9. A method of producing a welded joint between aluminum and copper, said weld being characterized by high tensile strength, high electrical conductivity and an improved resistance to corrosion as compared to a soldered joint between the same two metals, said method comprising fusing said metals and an aluminum welding rod at the interface between said aluminum and copper, said fusion being effected in the presence of an alkali metal halide flux and cadmium chloride.

WILLIAM MIDDLETON ROGERSON.